(12) United States Patent
Maroney

(10) Patent No.: US 9,277,670 B1
(45) Date of Patent: Mar. 1, 2016

(54) RISER CARD FOR RACK-MOUNTED NETWORK ATTACHED STORAGE

(71) Applicant: Western Digital Technologies, Inc., Irvine, CA (US)

(72) Inventor: John E. Maroney, Irvine, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 136 days.

(21) Appl. No.: 14/155,595

(22) Filed: Jan. 15, 2014

Related U.S. Application Data

(60) Provisional application No. 61/827,212, filed on May 24, 2013.

(51) Int. Cl.
*H05K 5/00* (2006.01)
*H05K 7/14* (2006.01)

(52) U.S. Cl.
CPC .................................. *H05K 7/1488* (2013.01)

(58) Field of Classification Search
CPC .................................. H05K 5/00; G16F 1/181
USPC .......................................................... 361/724
See application file for complete search history.

(56) References Cited

U.S. PATENT DOCUMENTS

| 5,935,227 | A | 8/1999 | Phan | |
| 7,525,797 | B2 | 4/2009 | Coglitore et al. | |
| 8,069,293 | B1 * | 11/2011 | Rogan et al. | 710/301 |
| 2009/0055157 | A1 * | 2/2009 | Soffer | 703/27 |
| 2009/0222609 | A1 * | 9/2009 | Ji et al. | 710/302 |
| 2010/0254096 | A1 * | 10/2010 | Kim et al. | 361/737 |
| 2010/0254100 | A1 * | 10/2010 | Kim et al. | 361/752 |
| 2012/0075795 | A1 * | 3/2012 | Petruzzo | 361/679.48 |
| 2013/0188309 | A1 * | 7/2013 | Ross | 361/679.48 |

\* cited by examiner

*Primary Examiner* — Forrest M Phillips

(57) ABSTRACT

The present invention relates to a new design for an extensible architecture for a rack-mounted network attached storage. In one embodiment, the design employs a riser card for a rack-mounted network attached storage. The riser card provides multiple, e.g., four, eight, etc., SATA connections from a PCIe bus on the motherboard. In addition, the riser card may provide power connections and a fan controller. In addition, the riser card supports dual-power inputs from multiple power supply sources. In one embodiment, the riser card can share power from AC power from the rack and a DC input to receive power from an external power supply.

17 Claims, 3 Drawing Sheets

RISER CARD FOR RACK-MOUNTED NETWORK ATTACHED STORAGE

CROSS-REFERENCE TO RELATED APPLICATION

This application claims priority to U.S. Provisional Application No. 61/827,212, entitled "RISER CARD FOR RACK-MOUNTED NETWORK ATTACHED STORAGE," filed May 24, 2013, which is herein incorporated by reference in its entirety.

BACKGROUND

Rack-mounted network attached storage (NAS) devices are employed by enterprises for various storage needs.

Equipment designed for rack-mounts typically have a height of that is standardized as multiples of 1.75 inches (44.45 mm) or one rack unit or U and 19-inches (482.6 mm) wide. Typically, a piece of equipment being installed has a front panel height 1/32 inch (0.031 inches or 0.787 millimeters) less than the allotted number of U's. Thus, a 1U rack-mounted computer is usually 1.719 inches (43.7 mm) tall. This allows a bit of room above and below an installed piece of equipment so it may be removed without binding on the adjacent equipment.

A rack-mounted configuration can be used for network-attached storage, for example, in a data center. The rack-mounted configuration enables the NAS device to be mounted within a standard rack that is common in most data centers. However, as noted above, the form factor for a rack-mounted, especially a 1U rack-mounted, has a limited height and space.

A riser card plugs in to the motherboard and provides additional slots for adapter cards, such as SATA interface. Riser cards are common in rack-mounted systems to allow the addition of feature cards in a horizontal position (instead of a standard vertical position). Unfortunately, the features of riser card 114s are generally limited.

BRIEF DESCRIPTION OF THE DRAWINGS

Systems and methods which embody the various features of the invention will now be described with reference to the following drawings, in which.

DETAILED DESCRIPTION

The embodiments relate to a rack-mounted device, and more particularly, it relates to a rack-mounted NAS. The rack-mounted NAS comprises a riser card. In one embodiment, the edge connector of the riser card connects to the motherboard via a Peripheral Component Interconnect Express (PCIe) connector, such as a PCIe expansion slot, and provides four SATA connectors for storage devices, such as hard disk drives manufactured by Western Digital Technologies, Inc.

In one embodiment, a rack-mounted network attached storage device comprises: an enclosure configured as a rack-mounted enclosure; a motherboard comprising at least one expansion slot; a riser card, coupled to the at least one expansion slot, comprising a first power interface for receiving power from an external DC power supply, a second power interface from an DC internal power supply for receiving power from the motherboard via the expansion slot, and a plurality of drive interface connectors; and a plurality of drives coupled to the riser card.

The enclosure may be configured as a 1U rack-mounted enclosure. The at least one expansion slot may be a PCIe expansion slot. The at least one expansion slot may also comprise a shared DC bus that allows power to be delivered bi-directionally. The riser card may comprise a first sharing circuit configured to share power received via the first and second power interfaces. The motherboard may comprise a second sharing circuit coupled to the first sharing circuit.

In one embodiment, a riser card comprises: a first connector configured for connection to a motherboard in a first direction; a plurality of drive interface connectors oriented in a second direction that is perpendicular from the first direction; a first power interface configured to receive AC power and provide DC power to the motherboard; a second power interface configured to receive DC power from an external power supply; and a sharing circuit configured to share power between the first and second power interfaces.

The plurality of drive interfaces connectors may be SATA connectors, and the like. The riser card may further comprise a DC-to-DC power regulator, or a fan controller. The sharing circuit can be configured to switch power between the power supply and power from the external power supply. In one embodiment, the first connector may be a PCIe expansion slot connector.

Certain embodiments of the inventions will now be described. These embodiments are presented by way of example only, and are not intended to limit the scope of the inventions. Indeed, the novel methods and systems described herein may be embodied in a variety of other forms. Furthermore, various omissions, substitutions and changes in the form of the methods and systems described herein may be made without departing from the spirit of the inventions. To illustrate some of the embodiments, reference will now be made to the figures.

Figure 1:
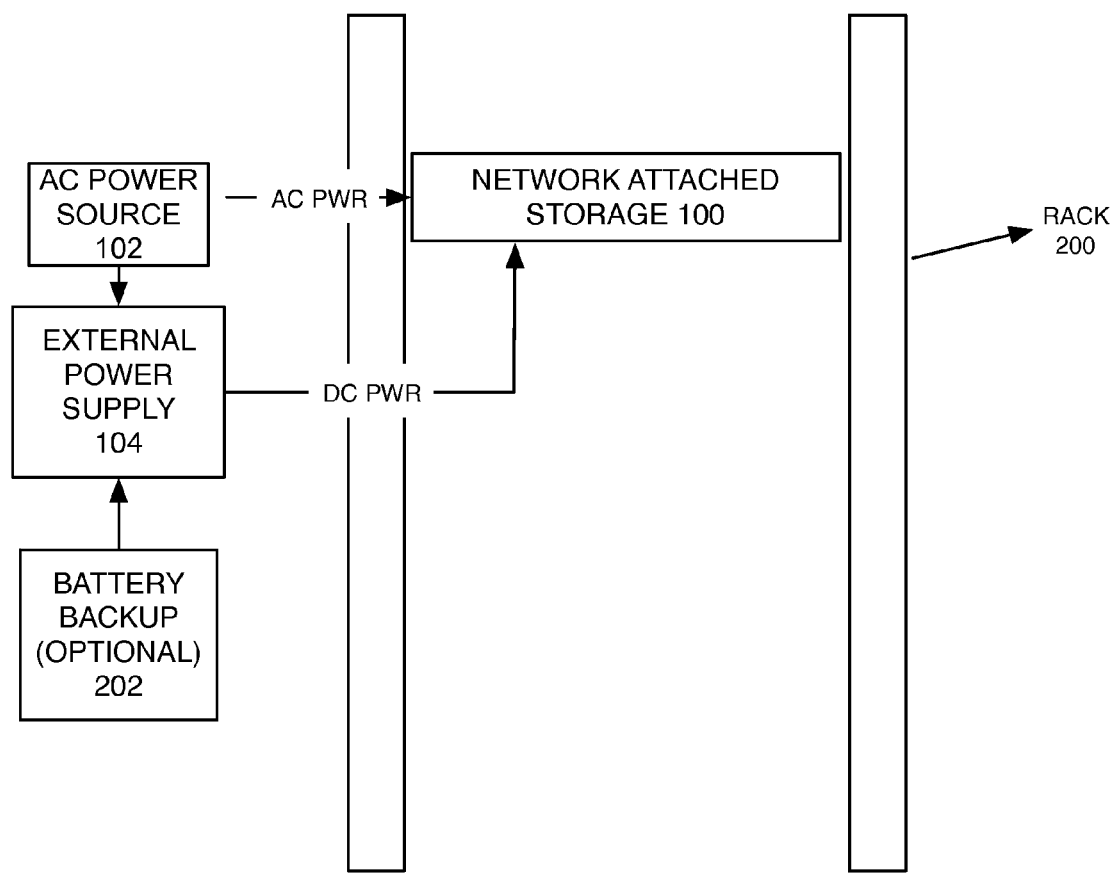
FIG. 1 illustrates one example of a NAS installed in a rack.

FIG. 1 illustrates one example of a storage server or network attached storage (NAS) 100 installed in a rack 200. As shown, the NAS 100 may be a rack-mounted unit, such as 1U, 2U, etc., that is mounted into a 19-inch rack, which are well known to those skilled in the art.

In some embodiments, as shown, the NAS 100 may be redundantly powered by one or more AC power sources. For example, as shown, the NAS 100 may receive AC power from an AC power source 102 via the rack 200 and from a secondary power source, such as DC power, from an external power supply 104. In the example shown, the external power supply 104 may be connected to the same AC power source 102 providing power to the rack 200. Alternatively, the external power supply 104 may be coupled to a different AC power source for sake of redundancy. In addition, the external power supply 104 may be coupled to a battery backup 202 to provide further redundancy, if desired.

Figure 2:
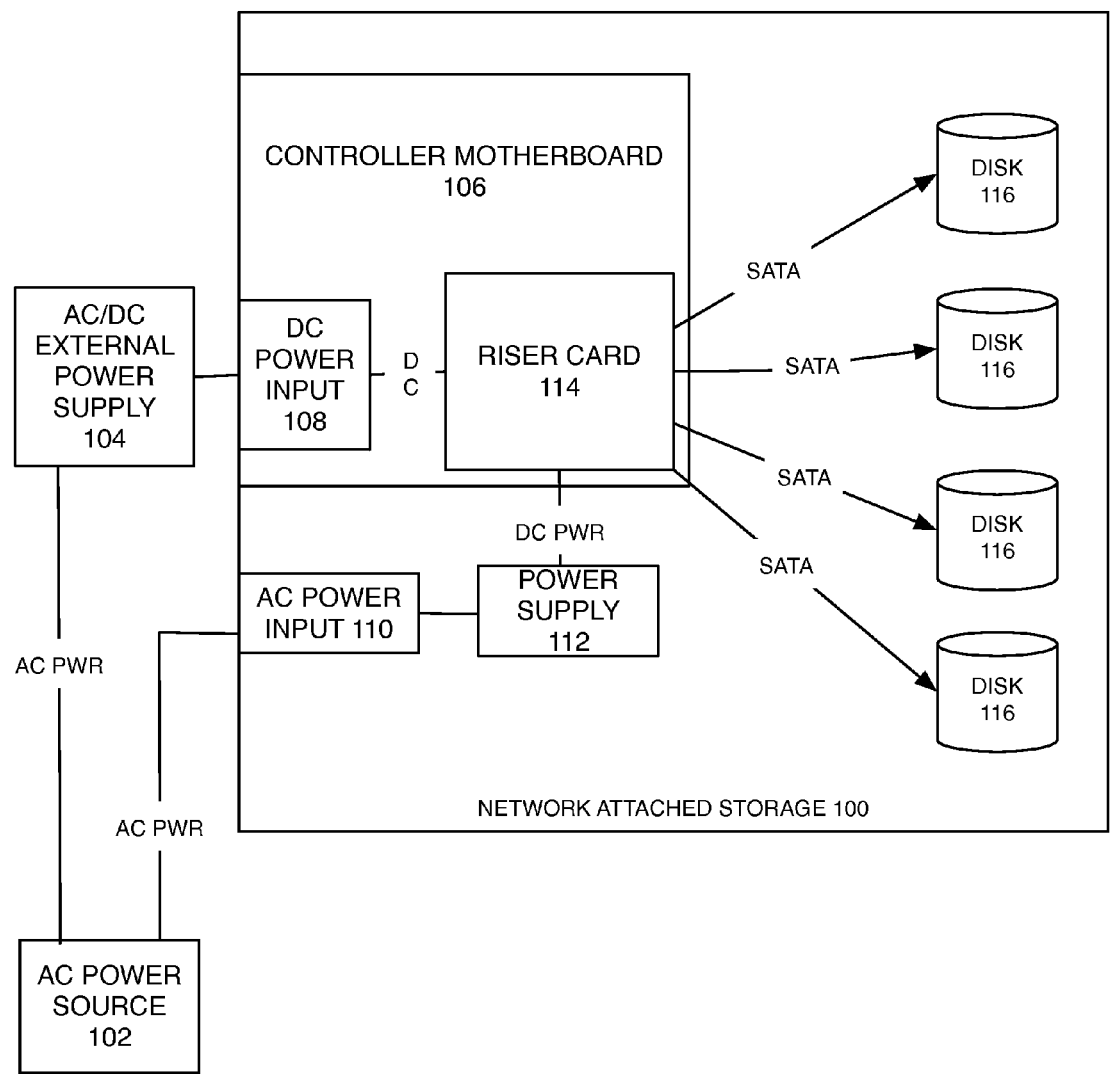
FIG. 2 illustrates a simplified block diagram for a NAS embodiment of the present invention.

FIG. 2 illustrates a simplified block diagram for a NAS embodiment of the present invention. As shown, the NAS 100 may comprise a motherboard 106 having a DC power input 108, and AC power input 110, and an internal power supply 112. A riser card 114 may be provided on the motherboard 106 to provide a storage interface for disks 116.

In the embodiment shown, the NAS 100 is provided in a 1U form factor for rack mounting in rack 200 and may comprise multiple drives, such as 4 SATA hard disk drives 116. Such devices are well known to those skilled in the art. Other embodiments may be implemented for different sizes, such as 2U, 3U, etc.

The motherboard 106 is a printed circuit board that comprises various electronic components that control the operation of the NAS 100. For example, the motherboard 106 may comprise a processor, memory, and connectors, such as network connections, etc. (components not shown for sake of clarity in FIG. 2). As shown in FIG. 2, the motherboard 106 may comprise an expansion slot, such as a PCI-express or PCI-E that is used by the riser card 114.

The riser card 114 may be inserted into an expansion slot of the motherboard 106 and provides additional slots for the motherboard 106. For example, in one embodiment, the riser card 114 provides SATA connections for the hard disk drives 116 in the NAS 100. In this embodiment, the riser card 114 is thus integrated into the motherboard 106 and allows the SATA connections or other feature cards to be oriented in a horizontal direction to accommodate the form factor of the 1U rack-mounted.

The riser card 114 may also accommodate multiple power connections that support multiple power supplies. Thus, in the embodiments, a rack-mounted NAS 100 provides power redundancy. In one embodiment, the riser card 114 serves as a redundant power interface that receives AC power from the rack via AC power supply 102 and AC power input 110 and provides a second power input, such as a DC power input or jack 108, to which the external power supply 104 can be connected. The riser card 114 may also comprise more advanced power management features, such as a power sharing, load balancing, etc. when dual power supplies are coupled to the riser card 114 (shown in FIG. 3).

As shown in FIG. 2, the NAS 100 may be redundantly powered from one or more AC power sources. In the example shown in FIG. 2, the NAS 100 may comprise an AC power input jack 110 to receive AC power from the rack 200 or an AC power supply 102 into an AC power input 102. The AC power input 110 then delivers AC power to an internal power supply 112 located on the motherboard 106 (or riser card 114), which converts the AC power into DC power. The DC power is then routed through a power interface on the riser card 114 (shown in FIG. 3). In addition, the riser card 114 may comprise a second power input, such as a DC input jack 108 that receives DC power, for example, from an external AC/DC power supply 104. In the example shown in FIG. 2, the power supply 104 is connected to the same AC power source 102. As noted, for sake of redundancy, the external power supply 104 may be connected to a different power source, as well as a battery backup, such as battery backup 202 (shown in FIG. 1). Accordingly, the riser card 114 may provide redundant power if either the AC power 102, power supply 112, or the AC/DC external power supply 104 should fail.

In some embodiments, further power redundancy may be provided. For example, the external AC/DC power supply 104 may comprise or be connected to a battery backup power supply 202 (not shown in FIG. 2). Other forms of power redundancy may be implemented in the embodiments.

Figure 3:
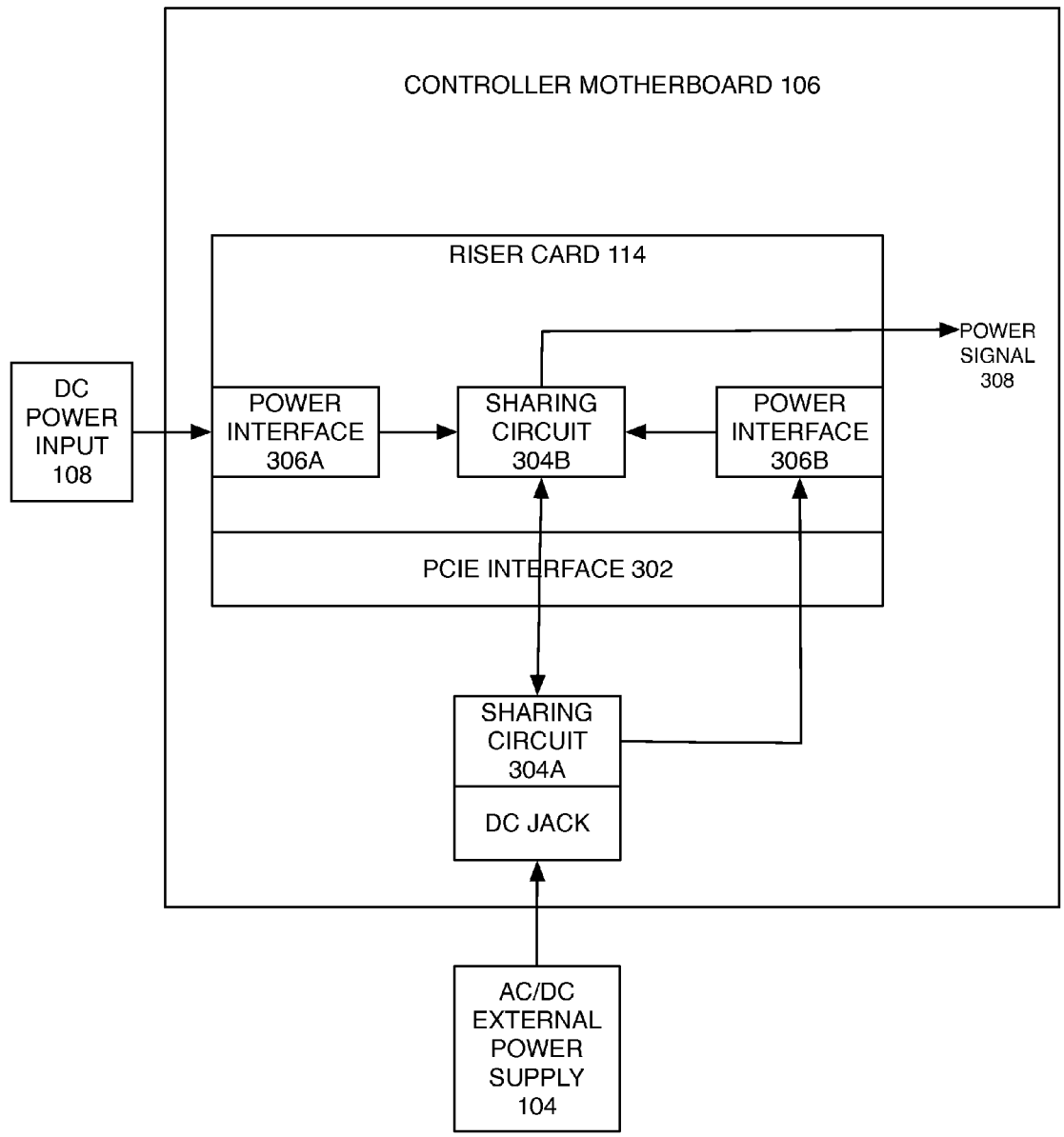
FIG. 3 illustrates a more detailed view of a block diagram for a motherboard and riser card for an embodiment.

FIG. 3 shows a more detailed view of the motherboard and riser card 114. As shown, the riser card 114 may serve as a multi-interface so that the motherboard 106 can receive power from multiple sources. In the example shown in FIG. 3, the riser card 114 may receive DC power via a first power interface 306A from the rack (or other power supply) as well as DC power from the external power supply 104 via its second power interface 306B. The DC power from this external power supply 104 is routed through a first sharing circuit 304, a PCIe expansion slot 302, and the power interface 306B on the riser card 114.

As further shown, the riser card 114 comprises a second sharing circuit 304B which is paired with the first sharing circuit 304B to manage the power signals delivered by both sources of power. In some embodiments, the sharing circuits 304A and 304B may provide various power management features, such as high/low voltage protection, current protection, load sharing, etc.

In the example shown, the NAS 100 is a 1U device and the motherboard comprises an ATOM processor, such as those manufactured by the Intel Corporation, various network communications ports for a display, USB 3.0, and Ethernet (RJ45) communications. In addition, the motherboard may accommodate a SATA 4X riser card 114, which is connected to the motherboard via a PCIe expansion slot. As shown, the NAS 100 can receive power AC power via an AC inlet and DC power via a DC jack.

The features and attributes of the specific embodiments disclosed above may be combined in different ways to form additional embodiments, all of which fall within the scope of the present disclosure. Although the present disclosure provides certain embodiments and applications, other embodiments that are apparent to those of ordinary skill in the art, including embodiments, which do not provide all of the features and advantages set forth herein, are also within the scope of this disclosure. Accordingly, the scope of the present disclosure is intended to be defined only by reference to the appended claims.

What is claimed is:

1. A rack-mounted network attached storage device comprising:
    an enclosure configured as a rack-mounted enclosure;
    a motherboard comprising at least one expansion slot;
    a riser card, coupled to the at least one expansion slot, comprising:
        a first power interface configured to receive power from an external DC power supply,
        a second power interface from an internal DC power supply configured to receive power from the motherboard via the expansion slot,
        a plurality of drive interface connectors; and
        a first sharing circuit configured to share power received via the first and second power interfaces, and
    a plurality of drives coupled to the riser card.

2. The rack-mounted network attached storage device of claim 1, wherein the enclosure is configured as a 1U rack-mounted enclosure.

3. The rack-mounted network attached storage device of claim 1, wherein the at least one expansion slot is a Peripheral Component Interconnect Express (PCIe) expansion slot.

4. The rack-mounted network attached storage device of claim 1, wherein the motherboard comprises a second sharing circuit coupled to the first sharing circuit.

5. The rack-mounted network attached storage device of claim 1, wherein the at least one expansion slot comprises a shared DC bus that allows power to be delivered bi-directionally.

6. A riser card comprising:
    a first connector configured for connection to a motherboard in a first direction;
    a plurality of drive interface connectors oriented in a second direction that is perpendicular from the first direction;
    a first power interface configured to receive AC power and provide DC power to the motherboard;

a second power interface configured to receive DC power from an external power supply; and a sharing circuit configured to share power between the first and second power interfaces.

7. The riser card of claim 6, wherein the plurality of drive interfaces connectors are SATA connectors.

8. The riser card of claim 6, further comprising a DC-to-DC power regulator.

9. The riser card of claim 6, further comprising a fan controller.

10. The riser card of claim 6, wherein the sharing circuit is configured to switch power between the power supply and power from the external power supply.

11. The riser card of claim 6, wherein the first connector is a PCIe expansion slot connector.

12. A redundantly powered rack-mounted network attached storage device comprising:

an enclosure configured as a rack-mounted enclosure;

a motherboard comprising at least one expansion slot;

a riser card, coupled to the at least one expansion slot, comprising:

a first power interface configured to receive power from a first power supply, a second power interface from a second power supply configured to receive power from the motherboard via the expansion slot, a plurality of drive interface connectors; and a power sharing circuit configured to balance power received via the first and second power interfaces, and a plurality of drives coupled to the riser card.

13. The rack-mounted network attached storage device of claim 12, wherein the first power interface comprises a power interface to an external DC power supply.

14. The rack-mounted network attached storage device of claim 12, wherein the first power interface comprises a power interface to an internal DC power supply.

15. The rack-mounted network attached storage device of claim 12, wherein the enclosure is configured as a 1U rack-mounted enclosure.

16. The rack-mounted network attached storage device of claim 12, wherein the at least one expansion slot is a PCIe expansion slot.

17. The rack-mounted network attached storage device of claim 12, wherein the riser card comprises a power sharing circuit configured to switch power received via the first and second power interfaces.

\* \* \* \* \*